United States Patent
Wright et al.

(10) Patent No.: US 12,500,747 B1
(45) Date of Patent: Dec. 16, 2025

(54) MULTI-FACTOR AUTHENTICATION WITH DEVICE AND CARRIER VALIDATION

(71) Applicant: Syniverse Technologies, LLC, Tampa, FL (US)

(72) Inventors: Chris Wright, Plant City, FL (US); Rajan John Thomas, Sanford, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 19/025,375

(22) Filed: Jan. 16, 2025

(51) Int. Cl.
| | |
|---|---|
| H04L 9/40 | (2022.01) |
| H04L 9/08 | (2006.01) |
| H04L 9/32 | (2006.01) |
| H04W 12/72 | (2021.01) |

(52) U.S. Cl.
CPC ............ *H04L 9/085* (2013.01); *H04L 9/3247* (2013.01); *H04L 9/3271* (2013.01); *H04W 12/72* (2021.01)

(58) Field of Classification Search
CPC ..... H04L 9/085; H04L 9/3247; H04L 9/3271; H04W 12/72
See application file for complete search history.

(56) References Cited

U.S. PATENT DOCUMENTS

| | | | |
|---|---|---|---|
| 10,567,952 B1* | 2/2020 | Finger | H04L 9/006 |
| 11,888,848 B1 | 1/2024 | Wright et al. | |
| 11,979,389 B1 | 5/2024 | John Thomas et al. | |
| 2016/0087957 A1* | 3/2016 | Shah | H04L 63/205 |
| | | | 726/1 |
| 2016/0226872 A1* | 8/2016 | Oberheide | H04L 63/0876 |
| 2017/0302640 A1* | 10/2017 | Maletsky | H04L 9/3242 |
| 2017/0338962 A1* | 11/2017 | Li | H04L 69/326 |
| 2020/0007334 A1* | 1/2020 | Shah | H04L 9/3271 |
| 2021/0112411 A1* | 4/2021 | Pazhyannur | H04W 12/06 |
| 2021/0126801 A1 | 4/2021 | Nix | |
| 2021/0377051 A1* | 12/2021 | Pai | H04L 9/0825 |
| 2022/0197986 A1* | 6/2022 | Zizi | H04L 63/0861 |
| 2023/0089865 A1* | 3/2023 | Peddada | H04L 9/0827 |
| | | | 380/282 |
| 2024/0195625 A1* | 6/2024 | Yang | H04L 9/3213 |

FOREIGN PATENT DOCUMENTS

WO     2023217357 A1     11/2023

* cited by examiner

*Primary Examiner* — Ghodrat Jamshidi
(74) *Attorney, Agent, or Firm* — Anton J. Hopen; Trenam Law (57) ABSTRACT

The invention provides systems, methods, and computer-readable media for multi-factor authentication (MFA) using device and carrier validation. A user device generates an attested blob containing cryptographic keys and a Universal Integrated Circuit Card (UICC)-originated International Mobile Subscriber Identity (IMSI), which is transmitted to a cloud-based MFA service. The service validates the attested blob, coordinates with an Original Equipment Manufacturer (OEM) service, and executes an Extensible Authentication Protocol-Authentication and Key Agreement (EAP-AKA) process with the carrier network to establish mutual trust. Authentication data, including a validated phone number independent of the device's stored number, is securely stored in a cloud wallet. The invention enhances security by mitigating risks such as spoofing, replay attacks, and SIM swapping, providing a novel authentication framework compatible with modern networks.

20 Claims, 6 Drawing Sheets

MULTI-FACTOR AUTHENTICATION WITH DEVICE AND CARRIER VALIDATION

BACKGROUND OF THE INVENTION

1. Field of the Invention

The described embodiments relate generally to multi-factor authentication and security protocols for verifying user identity across digital platforms. Specifically, the described embodiments relate to systems and methods for enhancing authentication reliability through the integration of device and carrier validation mechanisms, leveraging communication networks and cryptographic techniques to confirm identity and ensure secure access to resources.

2. Brief Description of the Related Art

The current state of multi-factor authentication (MFA) systems, particularly those relying on SMS-based one-time passwords (OTPs), suffers from significant vulnerabilities that compromise security and reliability. Despite its widespread adoption, SMS-based MFA is plagued by deficiencies stemming from technical limitations and systemic weaknesses, which render it unsuitable for high-security applications.

One of the most critical drawbacks is the lack of end-to-end encryption in SMS communication protocols. SMS messages, including OTPs, are transmitted over channels that remain unencrypted at multiple points during transit. Attackers can intercept these messages using techniques such as man-in-the-middle (MITM) attacks, cell tower spoofing, or rogue base station attacks. The reliance on the outdated Signaling System 7 (SS7) protocol exacerbates this vulnerability, as SS7 lacks modern security mechanisms and is susceptible to unauthorized access. Intercepted OTPs can be exploited to bypass authentication measures, posing severe risks to user accounts and sensitive transactions.

Another major vulnerability arises from the reliance on a phone number as the primary identifier in SMS-based MFA systems. Attackers commonly exploit this reliance through SIM swapping and number porting attacks. In these scenarios, an attacker fraudulently transfers a victim's phone number to a new SIM card under their control. This allows the attacker to receive all SMS messages, including OTPs, intended for the victim. Weak identity verification processes employed by mobile carriers, such as the use of easily compromised personal information, further amplify the risk of such attacks.

SMS-based MFA also fails to address the trustworthiness of the device receiving the OTP. Current systems do not validate whether the device is authentic or authorized to receive sensitive authentication data. As a result, attackers can register disposable or virtual numbers and leverage them to circumvent authentication measures. Furthermore, malware on a user's device can intercept and exfiltrate OTPs without the user's knowledge, exploiting the lack of device-level verification mechanisms.

The systemic reliance on SS7 introduces additional risks beyond message interception. Attackers can exploit SS7 to manipulate message routing, track user locations, or impersonate legitimate carriers. These vulnerabilities persist irrespective of user behavior, highlighting the fundamental insecurity of SMS as a communication medium for authentication.

Replay attacks represent another weakness in SMS-based MFA. OTPs intercepted during transmission can be reused by attackers to gain unauthorized access to systems or complete fraudulent transactions. While many systems impose time-based expiration limits for OTPs, these measures do not adequately counter attackers capable of exploiting intercepted OTPs within the validity period.

The usability and accessibility challenges of SMS-based MFA further undermine its effectiveness. Delays in OTP delivery caused by network congestion, international roaming issues, or outages can prevent timely authentication, disrupting user access to critical services. Additionally, SMS-based systems exclude individuals without access to mobile phones, reducing inclusivity and presenting barriers for certain user groups.

From a regulatory perspective, SMS-based MFA often fails to meet the stringent security requirements mandated by frameworks such as the General Data Protection Regulation (GDPR) and the California Consumer Privacy Act (CCPA). The transmission of unencrypted OTPs raises concerns about data privacy, exposing organizations to potential legal and financial liabilities.

Finally, SMS-based MFA is highly vulnerable to phishing and social engineering attacks. Attackers can deceive users into divulging OTPs through fraudulent SMS messages, voice calls, or emails, bypassing the intended security measures. These attacks exploit human behavior rather than technical weaknesses, making them particularly difficult to mitigate within the existing framework of SMS-based MFA.

BRIEF SUMMARY OF THE INVENTION

The present invention relates to systems, methods, and computer-readable media for establishing mutual trust between a user device and a carrier network through a robust multi-factor authentication (MFA) framework. The invention employs cryptographic techniques, device-level validations, and carrier-integrated authentication processes to provide a secure and scalable solution to modern authentication challenges.

The invention begins with a user device generating an attested blob, which is a cryptographically secured data structure containing essential elements for authentication. The attested blob includes a device MFA public key, a Universal Integrated Circuit Card (UICC)-originated device International Mobile Subscriber Identity (IMSI), and a device token. Optionally, the attested blob may also include an attestation signature generated by the device MFA service. This signature, created using a private key stored securely within the device's Trusted Execution Environment (TEE), certifies the authenticity and integrity of the data included in the blob. The attested blob is transmitted from the user device to a cloud-based MFA service, which plays a central role in orchestrating and securing the authentication process.

The cloud MFA service validates the request, and the cloud MFA service transmits it to an Original Equipment Manufacturer (OEM) identification service. The OEM identification service validates the attested blob by verifying the attestation signature to confirm that the data originates from a legitimate and secure device by confirming its authenticity and compliance with predefined security requirements. This additional layer of verification ensures that only authorized devices are allowed to participate in the MFA process.

Following the OEM validation, the cloud MFA service sends the UICC-originated IMSI included in the attested blob to a home operator node associated with the carrier network. The home operator node, which may be implemented as a Home Location Register (HLR) in 2G/3G networks or a Home Subscriber Server (HSS) in LTE and 5G networks, initiates an Extensible Authentication Protocol-Authentication and Key Agreement (EAP-AKA) process. During this process, the home operator node generates an akaChallenge, which includes a nonce and other cryptographic elements necessary for mutual authentication between the device and the network. The akaChallenge is then transmitted to the cloud MFA service, which forwards it to the user device.

The user device, upon receiving the akaChallenge, uses cryptographic keys and algorithms stored on its UICC to compute a corresponding akaResponse. The akaResponse, along with the nonce, is sent back to the cloud MFA service, which validates the akaResponse to ensure that it matches the expected output derived from the akaChallenge. As a next step, a cryptographic validation is performed with the keys provided by the carrier to ensure that the cryptography function matches that of the UICC. A successful validation confirms the authenticity of the user device and establishes mutual trust between the device and the carrier network.

Once mutual trust is established, the home operator node provides the cloud MFA service with a validated phone number associated with the device. Importantly, this validated phone number is derived directly from the carrier network and is independent of any phone number stored on the device itself. This ensures that the authentication process is not compromised by spoofed or tampered device information.

The cloud MFA service stores the validated phone number, along with the device token, the UICC-originated IMSI, and the device MFA public key, in a secure cloud wallet. This cloud wallet acts as a repository for all critical authentication data and is designed to ensure the integrity, confidentiality, and availability of the stored information. The secure storage of this data enables efficient management of authentication sessions and provides a reliable reference for subsequent validation requests.

To enhance the robustness of the system, the invention supports several advanced security features. For example, the cloud MFA service can periodically revalidate the UICC-originated IMSI by repeating the EAP-AKA process. This ensures that the device remains trustworthy and compliant with security standards over time. Additionally, the cloud MFA service employs post-quantum cryptographic algorithms to secure communication channels and protect sensitive data from emerging computational threats, such as those posed by quantum computers.

The invention also incorporates mechanisms for handling specific events that may impact the security of the authentication process. For instance, if the device MFA service detects a device event, such as a UICC replacement, SIM ejection, or device reactivation, it initiates the provision process. This involves generating a new key pair for the device MFA service, carrier validation and updating the associated data in the secure cloud wallet. New key establishment along with carrier validation ensures that the system remains resilient against potential security breaches arising from changes to the device environment.

Furthermore, the cloud MFA service facilitates user interaction during authentication by generating device push notifications. These notifications, encrypted with a key derived from the device MFA public key, contain transaction details or authentication requests that the user must review and approve. Once the user provides consent, the device MFA service generates an encrypted user consent response, which is sent back to the cloud MFA service for validation. This process adds an additional layer of user-driven security, ensuring that only authorized actions are carried out.

To provide a comprehensive solution, the invention includes additional cryptographic operations. For example, the cloud MFA service can encapsulate the device MFA public key to generate a shared key, which is stored in the secure cloud wallet alongside other authentication data. The shared key is used to encrypt sensitive information, such as the akaChallenge and transaction details, ensuring secure communication between the cloud MFA service and the user device. Similarly, the device MFA service can decapsulate encrypted data received from the cloud MFA service using its private key to derive the shared key and complete the key exchange process.

The invention also addresses potential discrepancies between the validated phone number retrieved from the home operator node and the phone number previously stored in the secure cloud wallet to enable phone number change and the new number retrieved from the home operator would be utilized. A separate provisioning would be done for each number on the device supporting devices with multiple lines.

The versatility of the invention extends to its implementation as a system and as computer-readable media. The system comprises a cloud-based MFA service configured to perform all the steps of the described method, including receiving and validating attested blobs via coordinating with the OEM identification service and the home operator node, and managing authentication data in a secure cloud wallet. The computer-readable media stores instructions that, when executed by a processor, cause the cloud MFA service to perform the same steps, ensuring that the invention can be deployed across various technological environments.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
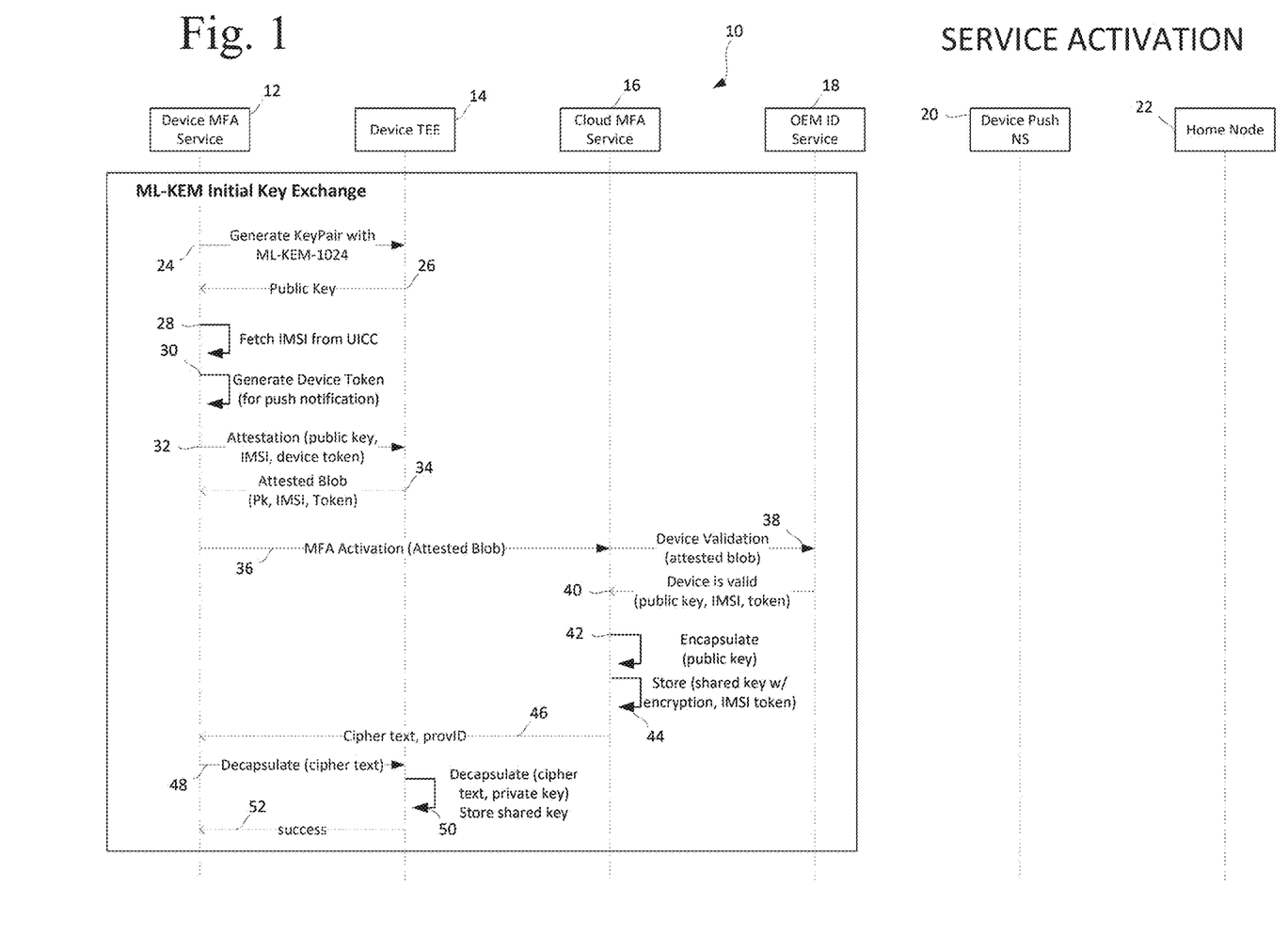
FIG. 1 is a call flow view for service activation using ML-KEM initial key exchange.

FIG. 1 illustrates the call flow for service activation, focusing on the ML-KEM (Modular Lattice Key Encapsulation Mechanism) initial key exchange process. The entities involved include the Device MFA Service (12), the Device TEE (14), the Cloud MFA Service (16), the OEM ID Service (18), the Device Push Notification Service (20), and the Home Node (22). Each element plays a distinct role in establishing mutual trust between the user device and the network.

The process begins at step (24), where the Device MFA Service generates a key pair using the ML-KEM-1024 algorithm. This cryptographic key pair ensures secure communication and encapsulation of data. The public key is extracted at step (26) from the Device TEE (14), a secure environment within the device designed to protect sensitive data.

At step (28), the Device MFA Service (12) fetches the International Mobile Subscriber Identity (IMSI) from the Universal Integrated Circuit Card (UICC). The IMSI serves as a unique identifier for the user device within the carrier network. Subsequently, at step (30), the Device MFA Service (12) generates a device token, which is used for push notification and session tracking during the authentication process. These elements are bundled together with the public key at step (32) to create an attested blob. This attested blob, which includes the public key, IMSI, and device token, is cryptographically signed by the TEE and is returned to the Device MFA service (34). The attested blob is transmitted to the Cloud MFA Service (16) at step (36) as part of the MFA activation process.

Upon receiving the attested blob at step (36), the Cloud MFA Service validates the request, and the Cloud MFA Service communicates with the OEM ID Service (18) at step (38) to confirm the legitimacy of the device by verifying the cryptographic signature of the blob. Once the device is verified, the packaged elements inside the blob like the public key, IMSI and device token are returned to the Cloud MFA Service (40). The cloud MFA service encapsulates the public key at step (42) to generate a shared key, which is stored alongside the IMSI and device token in encrypted form at step (44) and the generated cipher text is used to send back to the device.

The process concludes with step (46), where the generated cipher text and other tracking data are transmitted back to the Device MFA Service for decapsulation. The Device MFA Service uses its private key to decapsulate the cipher text and retrieve the shared key at step (48). This successful key exchange, confirmed at step (52), ensures that the device and network are securely synchronized for subsequent authentication processes. The decapsulated shared key is stored in the TEE (50) for subsequent cryptographic operation.

Figure 2:
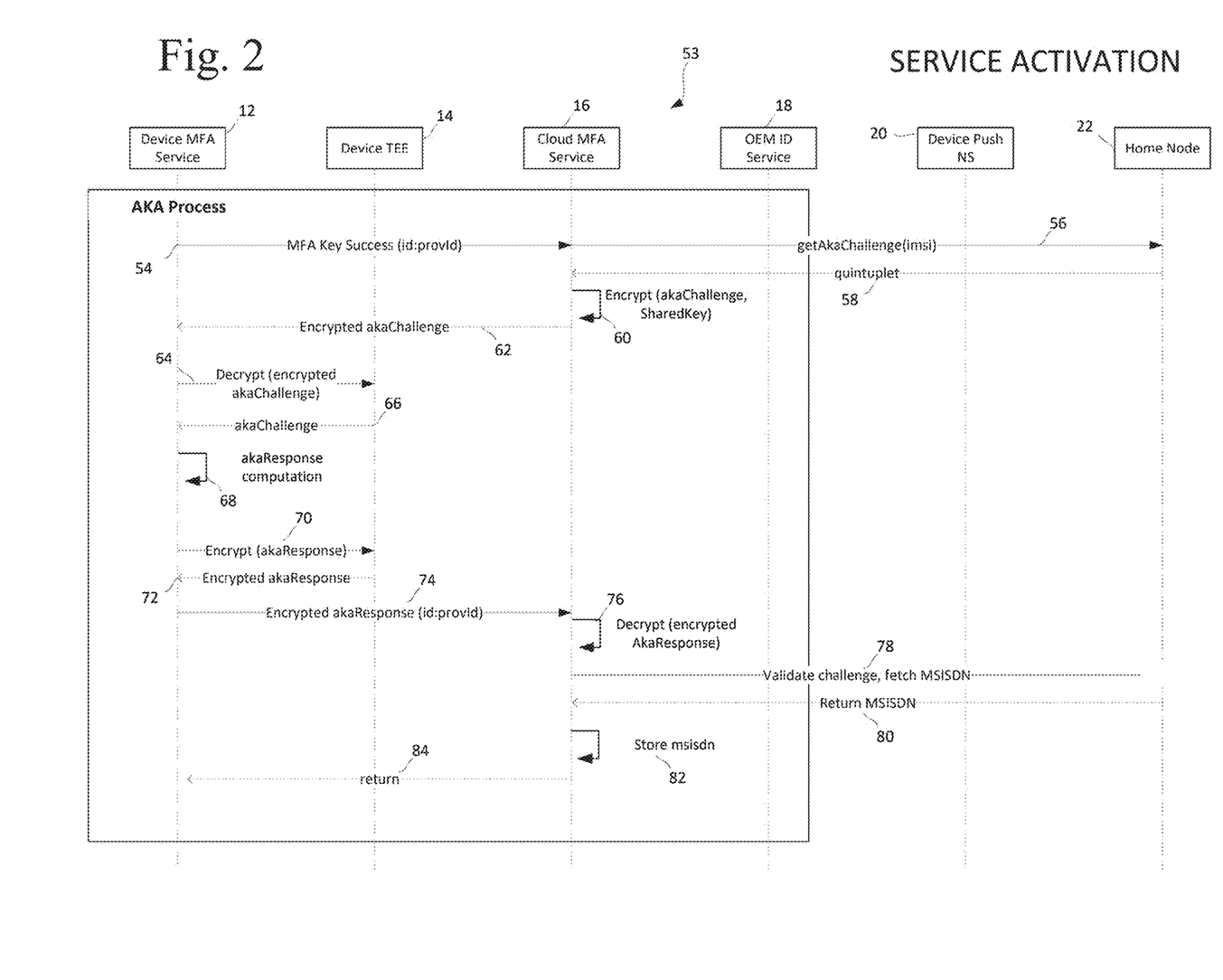
FIG. 2 is a call flow view for service activation enumerating the AKA process.

FIG. 2 expands on service activation by detailing the Extensible Authentication Protocol-Authentication and Key Agreement (EAP-AKA) process. This process establishes mutual trust between the user device and the carrier network. As in FIG. 1, the key entities include the Device MFA Service (12), Device TEE (14), Cloud MFA Service (16), OEM ID Service (18), Device Push Notification Service (20), and Home Node (22).

The sequence begins with step (54), where the Device MFA Service confirms the successful establishment of the shared key generated during the initial key exchange. At step (56), the Cloud MFA Service sends a request to the Home Node (22) to initiate the AKA process, transmitting the IMSI retrieved earlier. The Home Node responds at step (58) with a quintuplet containing the necessary cryptographic parameters for the AKA process.

At step (60), the Cloud MFA Service encrypts the akaChallenge using the shared key before forwarding it to the Device MFA Service at step (62). Upon receiving the encrypted akaChallenge, the Device MFA Service decrypts it at step (64, 66) and uses the IMSI to compute the akaResponse at step (68). This computation leverages secure algorithms stored in the UICC. Additional cryptographic function is performed with the keys stored on the UICC and is added to the akaResponse (68).

The akaResponse is encrypted at step (70, 72) and sent back to the Cloud MFA Service at step (74). The Cloud MFA Service decrypts the encrypted akaResponse at step (74) and checks for the expected response (78) and performs a cryptographic validation before sending the request to the Home Node to retrieve the MSISDN (78). The Home Node retrieves the associated MSISDN (Mobile Subscriber Integrated Services Digital Network Number) from its database. The MSISDN, which serves as the validated phone number, is returned to the Cloud MFA Service at step (80) and securely stored in the cloud wallet at step (82). The successful response is returned to the Device MFA client (84) to conclude the provisioning process.

Figure 3:
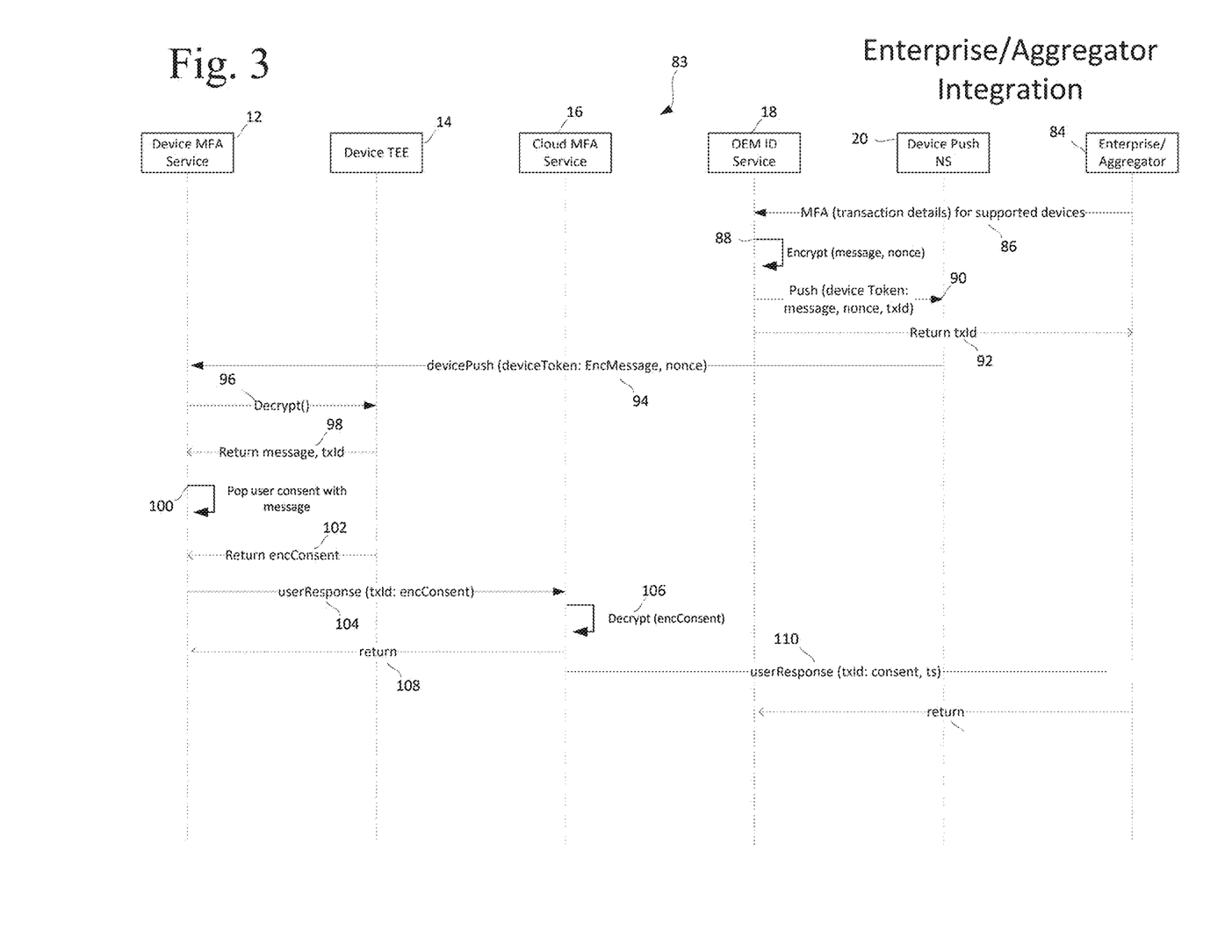
FIG. 3 is a call flow view enumerating enterprise-aggregator integration.

FIG. 3 illustrates the integration of the Cloud MFA Service with enterprise systems and aggregators. This diagram highlights the use of device push notifications for user consent validation and transaction approval.

The process begins at step (86), where the Enterprise/Aggregator (84) transmits transaction details to the Cloud MFA Service. The Cloud MFA Service encrypts the message and nonce using the device's shared key at step (88). The encrypted data is sent to the Device Push Notification Service at step (90), which pushes the notification to the user device at step (94). The user device decrypts the message at step (96) and displays the transaction details to the user at step (100).

At step (100), the user provides consent or denial for the transaction. The Device MFA Service encrypts the user's response at step (102) and transmits it back to the Cloud MFA Service at step (104). The Cloud MFA Service decrypts the user response at step (106) and verifies the consent. The acknowledgement is sent back to the device at step 108. The response sent by the device user (approval or denial), the Cloud MFA Service forwards the consent results to the Enterprise/Aggregator at step (110), completing the transaction workflow at step (112).

Figure 4:
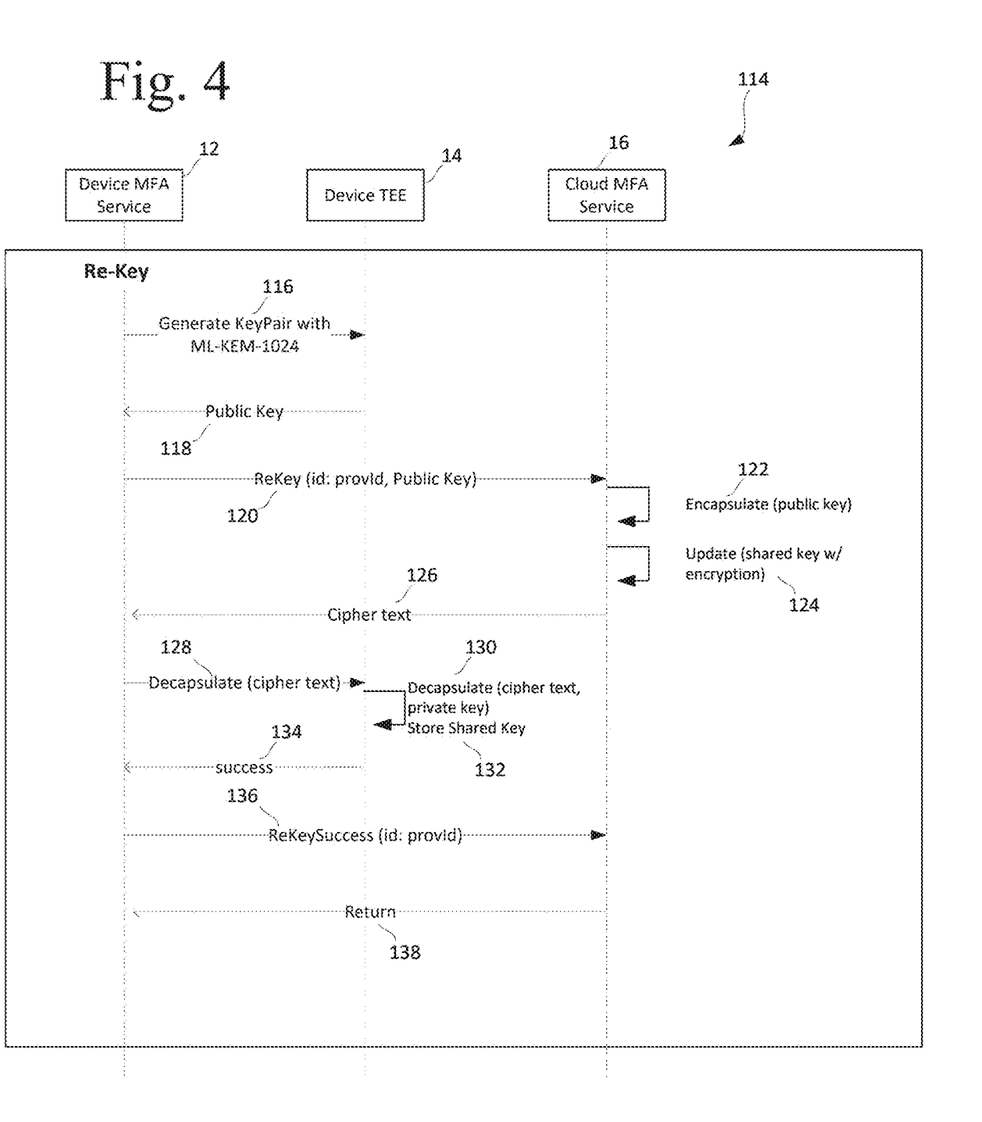
FIG. 4 is a call flow view enumerating a re-keying process.

FIG. 4 details the re-keying process, which is triggered as a standard best security policy based on a periodic basis. This ensures the security of the system is maintained. On any device event like UICC replacement, SIM ejection, or device reactivation, the reprovisioning process would start from the beginning to reestablish the trust.

At step (116), the Device MFA Service generates a new cryptographic key pair using the ML-KEM-1024 algorithm. The public key is sent back from the Device TEE at step (118) and subsequently forwarded to the Cloud MFA Service at step (120). The Cloud MFA Service encapsulates the new public key at step (122) to generate an updated shared key, which is securely stored at step (124).

At step (126), the generated cipher text is transmitted to the Device MFA Service, where it is decapsulated at step (128) using the private key. The successful decapsulation and storage of the updated shared key at step (132) ensure that all subsequent communications are encrypted with the latest cryptographic parameters is acknowledged at step (134). The re-keying process concludes with a confirmation message sent to the Cloud MFA Service at step (136), signifying the completion of the re-keying process with an acknowledgement from Cloud MFA Service at step (138).

Figure 5:
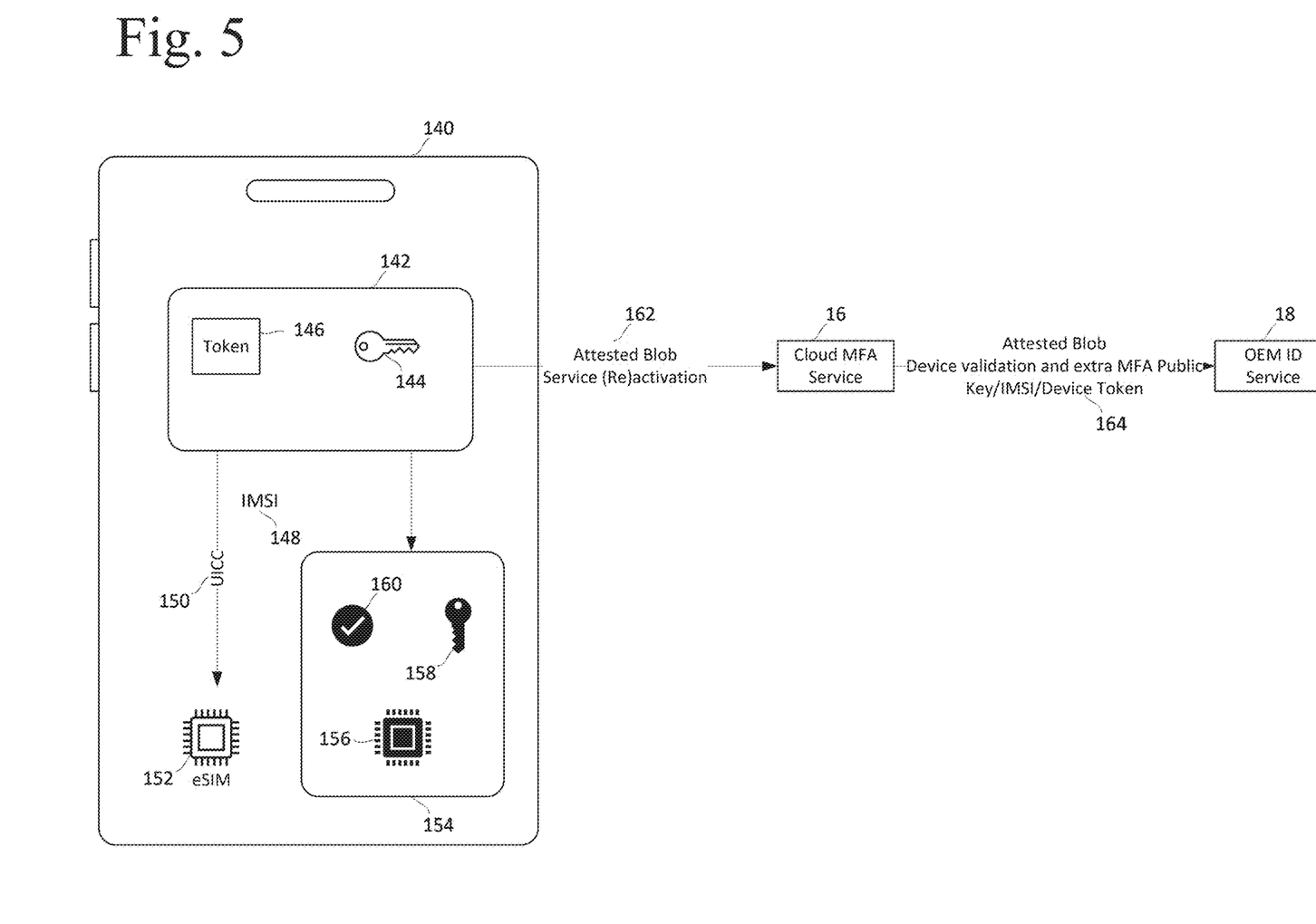
FIG. 5 is a diagrammatic view showing a first step in device activation according to the invention.

FIG. 5 illustrates the process of service activation and revalidation on a user device (140), emphasizing the generation and validation of an attested blob. The key components include the device MFA service (142), the trusted execution environment (TEE) (154), and the cloud MFA service (16). This figure showcases the roles of device cryptographic elements and their interaction with the cloud MFA service and OEM ID service (18).

The sequence begins within the user device (140), where the device MFA service (142) generates a device token (146)

and a key pair comprising an MFA public key (144) and an MFA private key (158). These keys are securely managed within the trusted execution environment (TEE) (154). Concurrently, the IMSI (148) is fetched from the UICC (150) which can be a regular or eSIM (152), providing the unique identifier for the device within the carrier network. The immutable device identity (156), which is assigned by the OEM and resides in the TEE, is also included in this process to establish device authenticity.

At this stage, the attestation process occurs within the TEE (160). The TEE combines the MFA public key (144), IMSI (148), and device token (146) to generate an attested blob (162). This cryptographically signed blob encapsulates all the elements required for authentication. The attested blob is then transmitted to the cloud MFA service (16), which validates its contents via the OEM ID service (18). This validation ensures that the information received from the user device (140) is legitimate and untampered.

Once the cloud MFA service (16) validates the request, the attested blob is forwards the blob to the OEM ID service (18) for additional verification (164). The OEM ID service cross-references the attested blob with the immutable device identity (156) to ensure the device's legitimacy. Upon successful validation, the OEM ID service confirms the integrity of the device to the cloud MFA service, completing the revalidation phase. This process serves for maintaining trust within the authentication framework, especially after events like SIM ejection, device reboots, or UICC replacements.

Figure 6:
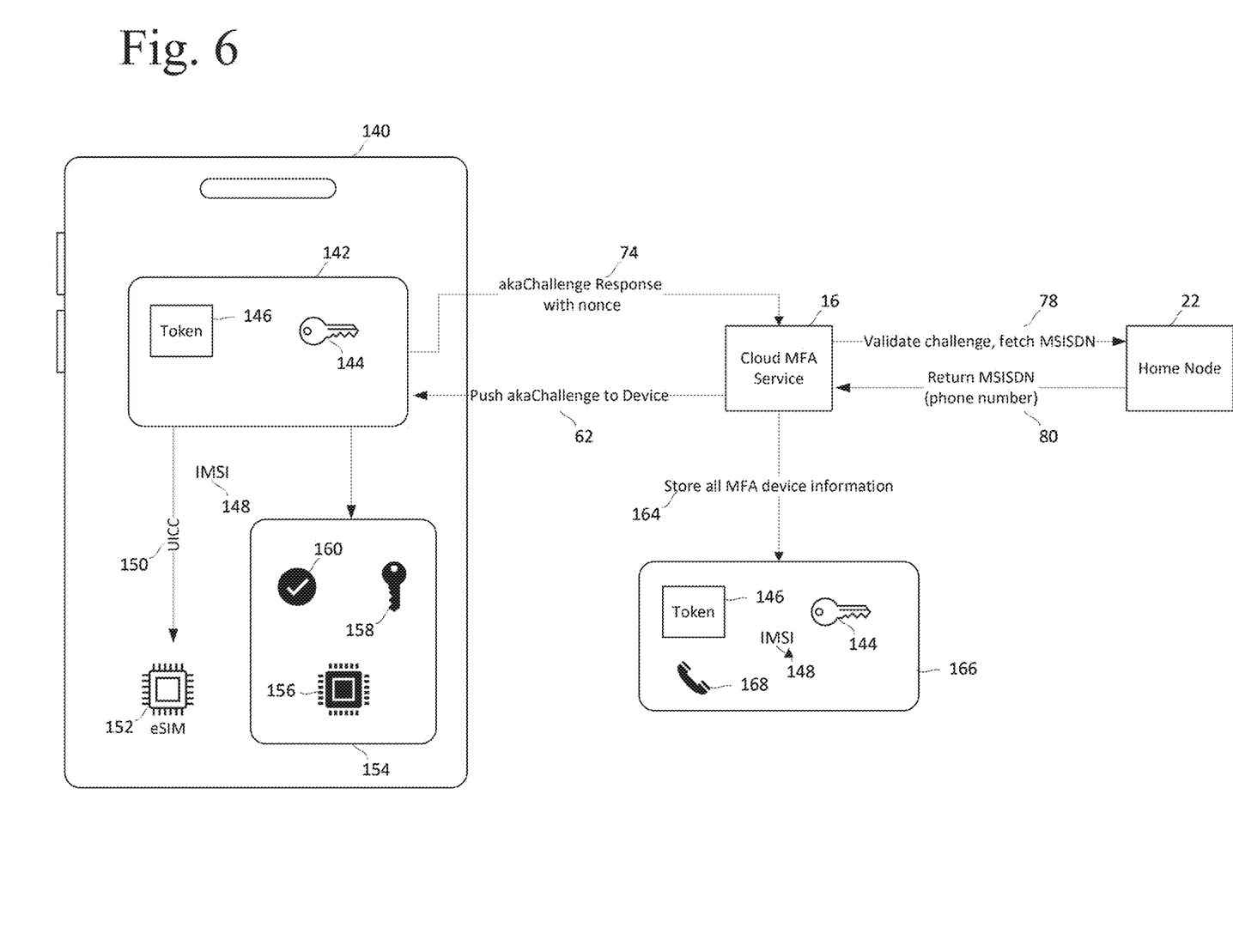
FIG. 6 is a diagrammatic view showing a second step in device activation according to the invention.

FIG. 6 expands upon the service activation process by illustrating the Extensible Authentication Protocol-Authentication and Key Agreement (EAP-AKA) process, along with the storage of validated data in the cloud wallet (166). The figure highlights interactions between the device MFA service (142), the cloud MFA service (16), the home node (22), and the cloud wallet.

The sequence begins after the successful revalidation described in FIG. 5. The cloud MFA service (16) initiates the EAP-AKA process by transmitting an IMSI (148) to the home node (22. The home node processes the IMSI to generate an akaChallenge, nonce and cryptographic keys for validation, which it returns to the cloud MFA service (16). The cloud MFA service forwards this challenge to the device MFA service (142) (62).

Within the user device (140), the device MFA service (142) decrypts and processes the akaChallenge using the IMSI (148), the MFA private key (158), and the cryptographic capabilities of the trusted execution environment (154). The device MFA service computes the akaResponse and the cryptographic response, which is then encrypted and transmitted back to the cloud MFA service (74).

The cloud MFA service validates the akaResponse as indicated by the home node (22) for validation along with the cryptographic function. After successful validation of the akaResponse, the Cloud MFA Service (78), the request is sent to the Home Node for fetching the MSISDN (80). The Home Node uses its database and retrieves the Mobile Station International Subscriber Directory Number (MSISDN), also known as the validated phone number (168). The home node transmits the MSISDN back to the cloud MFA service (80).

Upon receiving the validated phone number, the cloud MFA service securely stores the phone number (168), along with the device token (146), MFA public key and its shared key (144), and IMSI (148), in the cloud wallet (166). The cloud wallet serves as a secure repository for authentication data, enabling

TABLE OF REFERENCE NUMERALS

| | |
|---|---|
| 10: ML-KEM initial key exchange (process in service activation) | 134: Return process for re-keying |
| 12: Device MFA Service | 136: Completion of re-keying |
| 14: Device TEE | 140: User Device |
| 16: Cloud MFA Service | 142: Device MFA Service |
| 18: OEM ID Service | 144: MFA Public Key |
| 20: Device Push Notification Service | 146: Device Token |
| 22: Home Node | 148: IMSI (International Mobile Subscriber Identity) |
| 53: AKA process (service activation process) | 150: UICC (Universal Integrated Circuit Card) |
| 83: Enterprise/Aggregator integration process | 152: eSIM |
| | 154: Trusted Execution Environment (TEE) |
| 114: Re-keying process | 156: Immutable Device Identity |
| 116: Generate new key pair during re-keying | 158: MFA Private Key |
| 118: Public key (during re-keying) | 160: Attestation in TEE |
| 120: Encapsulate public key | 162: Attested Blob |
| 122: Update shared key with encryption | 164: Validation of attested blob by Cloud MFA Service and/or OEM ID Service |
| 124: Cipher text for re-keying | 166: Cloud Wallet |
| 126: Decapsulate cipher text | 168: Phone Number (MSISDN) |
| 128: Private key (during re-keying) | |
| 130: Store shared key after decapsulation | |
| 132: ReKeySuccess message | |

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subjectmatter restrictions, claims to this invention as a software product are those embodied in a non-transitory software medium such as a computer hard drive, flash-RAM, optical disk or the like.

Program code embodied on a machine-readable medium, whether for smartphone applications or telecom networking infrastructure, may be transmitted using a wide variety of media. These media include wireless communication channels such as cellular networks (e.g., 4G, LTE, and 5G), Wi-Fi, and Bluetooth, as well as wire-line connections like Ethernet and DSL. Optical fiber cables, known for their high bandwidth and low latency, are critical for transmitting large data volumes in telecom backhaul networks. Additionally, radio frequency (RF) transmission, commonly used in satellite communications and base station links, may also serve as a conduit for transmitting program code. These transmission media can operate independently or in combination, enabling robust, redundant, and high-performance communication essential for modern smartphone applications and telecom infrastructure.

Machine-readable program code designed to implement operations for aspects of the present invention may be written in any combination of one or more programming languages. Object-oriented programming languages such as Java, C#, C++, and Rust are particularly suited for both smartphone application development and telecom networking systems. For smartphones, object-oriented languages facilitate modular design, enabling the development of applications that are scalable, maintainable, and efficient. These languages also power the frameworks and libraries used to manage device-specific features such as camera operations, location services, and user interfaces. In telecom networking, object-oriented programming is instrumental in building modular components for signaling protocols, network management systems, and software-defined networking (SDN) controllers. Rust, with its focus on memory safety and performance, is emerging as a valuable language for ensuring secure and efficient operations in both domains.

In addition to object-oriented languages, conventional procedural programming languages such as C remain a cornerstone of telecom infrastructure and smartphone firmware development. The C programming language, with its ability to directly interface with hardware, is frequently used in implementing device drivers, protocol stacks, and embedded systems. In smartphones, C is often utilized for performance-critical operations and battery optimization, ensuring that applications and core functions operate seamlessly. In telecom networks, C plays a vital role in the real-time processing of data, such as handling signaling protocols like SS7 and SCTP or managing packet switching in routers and switches.

Scripting languages, such as Python, Lua, and Perl, also hold significant relevance in both smartphone development and telecom systems. Python's simplicity and extensive libraries make it a popular choice for automating testing frameworks, developing AI-driven smartphone applications, and performing data analytics on mobile usage patterns. Lua, with its lightweight footprint and high execution speed, is often embedded within applications to provide extensibility and scripting capabilities for end-users. Similarly, Perl is widely used in telecom infrastructure for parsing log files, automating network configuration tasks, and managing large-scale telecom datasets. These scripting languages provide agility and flexibility, enabling developers to rapidly prototype, test, and deploy solutions in dynamic environments.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

Attestation Signature means a cryptographic signature generated by the device MFA service to certify the authenticity and integrity of specific device data transmitted to the cloud MFA service. This data includes, but is not limited to, the device MFA public key, the Universal Integrated Circuit Card (UICC)-originated International Mobile Subscriber Identity (IMSI), and the device token. The attestation signature is created using a private key stored within the Trusted Execution Environment (TEE) of the user device, ensuring that it originates from a secure and tamper-resistant environment. Upon receiving the attestation signature as part of the attested blob, the cloud MFA service via Original Equipment Manufacturer (OEM) identification service verifies the signature using the corresponding public key. This verification step confirms that the attested blob originates from a trusted device and has not been tampered with during transmission. The attestation signature ensures that the device participating in the authentication process is both genuine and authorized. This mechanism plays a vital role in establishing a secure and trustworthy communication channel between the user device, the cloud MFA service, and other entities such as the Original Equipment Manufacturer (OEM) identification service and the home operator node.

The use of cryptographic attestation signatures further safeguards against spoofing, replay attacks, or unauthorized devices attempting to gain access to the network. By providing a cryptographically secure mechanism for device validation, the attestation signature forms the foundation of trust in the multi-factor authentication (MFA) ecosystem, facilitating subsequent secure exchanges of sensitive information such as cryptographic keys and session tokens.

Attested Blob means a cryptographically secured data structure generated by the device MFA service, containing critical information used for device validation during multi-factor authentication. The attested blob includes the device MFA public key, the UICC-originated IMSI, the device token, and the attestation signature. The device MFA service creates the attested blob within the Trusted Execution Environment (TEE) of the user device to ensure the integrity and security of the data. Once generated, the attested blob is transmitted to the cloud MFA service for validation. The attestation signature within the attested blob provides cryptographic proof of the authenticity and integrity of the included data. The cloud MFA service via Original Equipment Manufacturer (OEM) uses this signature to confirm that the blob originates from a trusted device and has not been altered during transmission. After validating the attested blob, the cloud MFA service forwards it to the Original Equipment Manufacturer (OEM) identification service for further verification of the device's legitimacy. The attested blob enables the cloud MFA service to establish a secure and trusted relationship between the user device, the network, and other participating entities. This structure ensures that all subsequent steps in the authentication process, including the execution of the Extensible Authentication Protocol-Authentication and Key Agreement (EAP-AKA) procedure, are performed with a verified and authorized device. By incorporating cryptographic validation at this stage, the attested blob mitigates risks associated with device spoofing, unauthorized access, and tampering, reinforcing the security of the overall MFA framework.

AkaChallenge means a cryptographic challenge issued by a home operator node during the Extensible Authentication Protocol-Authentication and Key Agreement (EAP-AKA) process. The akaChallenge is a core component of mutual authentication between a user device and the network. It typically includes a sequence number, nonce, session-specific data, and other cryptographic elements required for the authentication process. Upon generating the akaChallenge, the home operator node transmits it to the user device via the cloud MFA service. The challenge is processed by the device using the cryptographic keys and algorithms stored on the Universal Integrated Circuit Card (UICC). The device generates an akaResponse in reply to the akaChallenge, which is then sent back to the MFA Cloud Service on behalf of the home operator node for validation. The purpose of the akaChallenge is to confirm the legitimacy of both the device and the network by requiring the device to perform cryptographic operations that can only be executed with valid UICC-stored keys. This ensures that the device attempting to authenticate is genuine and authorized to access network resources. The akaChallenge also facilitates the establishment of session keys used to secure further communication between the device and the network. By incorporating cryptographic principles, the akaChallenge ensures that the authentication process is resistant to replay attacks, tampering, and unauthorized access. Its role in establishing mutual trust and securing network sessions makes the akaChallenge a fundamental element of secure multi-factor authentication.

AkaResponse means a cryptographic response generated by a user device in reply to an akaChallenge during the Extensible Authentication Protocol-Authentication and Key Agreement (EAP-AKA) process. The akaResponse is created using the cryptographic keys and algorithms stored on the Universal Integrated Circuit Card (UICC) of the user device. Upon receiving the akaChallenge, the device processes the included nonce and associated cryptographic parameters, computing the akaResponse as proof of its authenticity. The akaResponse is then transmitted back to the cloud MFA service for validation. The Cloud MFA Service on behalf of the home operator node verifies the response by comparing it against the expected output based on the original akaChallenge. A successful match along with the cryptographic function match confirms the authenticity of the device and establishes mutual trust between the device and the network. The akaResponse also enables the derivation of session keys, which are used to encrypt and secure subsequent communications between the device and the network. This step is critical for ensuring that only authorized devices gain access to network resources. The akaResponse is resistant to tampering and replay attacks, as it relies on cryptographic principles and time-sensitive nonces. By requiring the generation and verification of the akaResponse, the EAP-AKA process ensures that the authentication protocol remains robust and secure against impersonation and other unauthorized activities. The akaResponse is a cornerstone of the overall security architecture, enabling the safe exchange of sensitive information in a multi-factor authentication framework.

Cipher Text means the encrypted form of data that results from applying a cryptographic algorithm to plaintext using a cryptographic key. In the context of this invention, cipher text is generated during key encapsulation processes such as those using the ML-KEM-1024 algorithm. It is securely transmitted between the user device and the Cloud MFA Service to ensure that sensitive information, including cryptographic keys and authentication data, is protected against interception and unauthorized access. Only authorized entities with the appropriate decryption keys, such as the MFA private key stored in the Trusted Execution Environment (TEE), can convert the cipher textback into its readable plaintext form.

Cloud MFA Service means a cloud-based system that facilitates multi-factor authentication (MFA) by performing device validation, cryptographic operations, and secure data management. The Cloud MFA Service acts as an intermediary between the user device, the Original Equipment Manufacturer (OEM) identification service, and the home operator node to establish mutual trust and secure communication. This service is responsible for receiving attested blobs generated by the device MFA service and verifying the attestation signature to ensure the integrity and authenticity of the device data. Upon validation, the Cloud MFA Service transmits the attested blob to the OEM identification service for device verification. Additionally, the Cloud MFA Service interacts with the home operator node to initiate the Extensible Authentication Protocol-Authentication and Key Agreement (EAP-AKA) process, forwarding the akaChallenge and nonce to the user device and help processing the resulting akaResponse. The service further validates the response by coordinating with the home operator node and retrieves a validated phone number, which it securely stores alongside other device-specific data in a cloud wallet. Beyond these core functions, the Cloud MFA Service encrypts sensitive data using post-quantum cryptographic algorithms to protect against tampering and unauthorized access. It can also initiate processes such as re-provisioning, device reactivation, and user consent validation to maintain the security and integrity of the authentication process. By providing centralized control and cryptographic security, the Cloud MFA Service ensures robust and reliable multi-factor authentication across a variety of devices and networks.

Device MFA Public Key means a cryptographic key generated by the device MFA service for use in secure authentication processes. The Device MFA Public Key is part of a public-private key pair, with the private key stored in the Trusted Execution Environment (TEE) of the user device. This key is included in the attested blob transmitted to the Cloud MFA Service and forms the basis of cryptographic validation and secure communication. Upon receipt, the Cloud MFA Service validates the public key using the attestation signature provided in the attested blob, confirming that the key originates from a trusted device. The Device MFA Public Key's derived shared key is used for various cryptographic functions, including encrypting sensitive data such as transaction details or authentication challenges. In addition, the key facilitates secure exchanges with other entities, such as the Cloud MFA Service, the OEM identification service, and the home operator node. The integrity and authenticity of the Device MFA Public Key are critical for ensuring that only authorized devices participate in the authentication process. This key also plays a central role in cryptographic operations, such as key encapsulation and post-quantum cryptography, further enhancing the security of the multi-factor authentication framework. By leveraging the Device MFA Public Key, the system ensures that all communications involving the user device are encrypted and resistant to tampering, interception, and replay attacks.

Device MFA Service means a software component or module operating on a user device that facilitates the generation and management of cryptographic keys and the preparation of authentication data for multi-factor authentication (MFA). The Device MFA Service is responsible for generating the attested blob, which includes the Device MFA Public Key, the Universal Integrated Circuit Card (UICC)-originated International Mobile Subscriber Identity (IMSI), the device token, and the attestation signature. These elements are securely encapsulated and transmitted to the Cloud MFA Service for validation. Operating within the Trusted Execution Environment (TEE), the Device MFA Service ensures that all cryptographic operations and sensitive data remain protected from unauthorized access or tampering. The service processes authentication challenges, such as the akaChallenge received during the Extensible Authentication Protocol-Authentication and Key Agreement (EAP-AKA) process, and generates the corresponding akaResponse. It may also encrypt user consent responses or transaction details for secure transmission to the Cloud MFA Service. Additionally, the Device MFA Service supports security functions such as reprovisioning, device reactivation, and periodic revalidation of the UICC-originated IMSI. By acting as the trusted interface between the user device and the authentication system, the Device MFA Service ensures that all device-specific authentication data is securely managed and communicated, forming a critical component of the MFA framework.

Device Token means a unique identifier generated by the Device MFA Service and included in the attested blob to enable secure and traceable interactions between the user device and the Cloud MFA Service. The Device Token is tied to the specific device and may be used to track and manage authentication sessions, validate transactions, or store session-related metadata in the secure cloud wallet. The device token is generated for the Device MFA Service and identifies the device and the application by the appropriate Device Push Notification Service. This device token is tied to the MSISDN and is used for the MFA operation for that MSISDN. The Device Token also supports security operations, such as linking the device with cryptographic keys and ensuring that transactions are associated with the correct device. By maintaining the integrity and uniqueness of the Device Token, the authentication system ensures secure, reliable, and efficient management of device-specific interactions in the MFA ecosystem.

Device Push Notification means a secure communication sent by the Cloud MFA Service to a user device to facilitate user consent validation or other authentication-related processes. The notification contains transaction details or authentication requests, encrypted using the Device MFA Public Key's shared key to ensure confidentiality and integrity. Device Push Notifications are triggered when user interaction or confirmation is required, such as approving a transaction, reactivating a device, or validating a new session. Upon receiving the notification, the user device decrypts the content within its Trusted Execution Environment (TEE) and displays it to the user for approval or interaction. The user's consent or response is then securely transmitted back to the Cloud MFA Service. By using cryptographically secured Device Push Notifications, the system ensures that sensitive information remains protected from tampering or interception and that only authorized users can interact with authentication requests.

Device Reactivation Event means an occurrence that triggers the Device MFA Service to revalidate the trust and authentication status of a user device. Examples of Device Reactivation Events include the replacement of a Universal Integrated Circuit Card (UICC), ejection or re-insertion of a SIM card, device restarts, or significant updates to the device's firmware or software. During a reactivation event, the Device MFA Service may require to generate a new key pair, create an updated attested blob, and repeat the validation processes involving the OEM identification service and home operator node. These steps ensure that the device continues to meet the necessary security standards and remains authorized within the multi-factor authentication (MFA) framework. Reactivation Events provide an additional layer of security by verifying that changes to the device environment have not compromised its integrity or authentication credentials.

Extensible Authentication Protocol-Authentication and Key Agreement (EAP-AKA) is an authentication protocol designed for secure communication and mutual authentication between a user device and a carrier network, particularly in 3G, LTE, and 5G environments. Tailored for use with Universal Integrated Circuit Cards (UICC), EAP-AKA begins with the user device transmitting an identifier, such as the International Mobile Subscriber Identity (IMSI), to the home operator node, which may be a Home Location Register (HLR) in 2G/3G networks or a Home Subscriber Server (HSS) in LTE/5G systems. The home operator node generates an authentication vector comprising an akaChallenge, a sequence number, and session keys. The akaChallenge along with the nonce is sent to the device via the network. The device, using its UICC, computes an akaResponse based on the challenge and pre-shared keys stored on the UICC, returning this response to the network for verification. EAP-AKA establishes mutual authentication by ensuring both the device and the network validate each other, safeguarding against man-in-the-middle attacks and unauthorized access. Session keys derived during this process secure subsequent communications, ensuring encryption and integrity. Within this invention, EAP-AKA facilitates trust by allowing the cloud-based multi-factor authentication (MFA) service to transmit the IMSI to the home operator node, receive the akaChallenge, and forward it to the device MFA service. The validated akaResponse enables retrieval of the Mobile Station International Subscriber Directory Number (MSISDN), or phone number, independently of the device, ensuring secure storage in the cloud wallet alongside other critical authentication data such as the device token and MFA public key.

Enterprise/Aggregator Integration means the process by which enterprises and aggregators interact with the Cloud MFA Service to manage authentication and transaction validation. This integration enables secure communication between enterprise systems, such as those handling user accounts or financial transactions, and the Cloud MFA Service. The process involves transmitting transaction details, encrypting them with device MFA public keys, and delivering them to the user device via push notifications. User responses, such as consent or denial, are returned to the enterprise or aggregator through the Cloud MFA Service. This integration facilitates secure, scalable, and traceable interactions across different entities while ensuring user authentication.

Home Location Register (HLR) means a database used in 2G and 3G networks to manage subscriber information and authentication data for mobile devices. The HLR stores the International Mobile Subscriber Identity (IMSI), phone numbers, and associated service profiles for each subscriber. During the authentication process, the HLR interacts with the Cloud MFA Service and the device MFA service by providing subscriber-specific information necessary for initiating and validating the Extensible Authentication Protocol-Authentication and Key Agreement (EAP-AKA) process. The HLR generates authentication challenges, verifies akaResponses, and helps establish secure communication channels between the device and the network. Although the HLR is specific to older network technologies, its functionality aligns with that of the Home Subscriber Server (HSS) in LTE and 5G networks, ensuring compatibility with broader authentication systems.

Home Operator Node means a network entity responsible for managing subscriber authentication and authorization within a mobile carrier network. The Home Operator Node encompasses systems such as the Home Location Register (HLR) in 2G and 3G networks and the Home Subscriber Server (HSS) in LTE and 5G networks. During the authentication process, the Home Operator Node interacts with the Cloud MFA Service to initiate and validate the Extensible Authentication Protocol-Authentication and Key Agreement (EAP-AKA) process. This includes generating akaChallenges, validating akaResponses, and providing session keys or other cryptographic materials. The Home Operator Node also provides the Cloud MFA Service with a validated phone number associated with the device, independently of the phone number stored on the device itself. By facilitating these critical functions, the Home Operator Node ensures secure and trusted interactions between devices, networks, and multi-factor authentication systems.

Home Subscriber Server (HSS) means a central database used in LTE and 5G networks to manage subscriber authentication, authorization, and service profiles. The HSS performs functions similar to the Home Location Register (HLR) in 2G and 3G networks but with additional capabilities tailored to advanced network architectures. The HSS interacts with the Cloud MFA Service and the device MFA service to facilitate the Extensible Authentication Protocol-Authentication and Key Agreement (EAP-AKA) process, providing authentication challenges, validating akaResponses, and issuing session keys. It also provides information necessary for network operations, such as subscriber location tracking and service provisioning. The HSS ensures that devices participating in the authentication process meet the network's security and operational standards.

IMSI means the International Mobile Subscriber Identity, a unique identifier stored on the Universal Integrated Circuit Card (UICC) of a mobile device. The IMSI is used by mobile networks to authenticate and identify subscribers during network access and other operations. During the Extensible Authentication Protocol-Authentication and Key Agreement (EAP-AKA) process, the IMSI is transmitted to the Home Operator Node, which uses it to generate an akaChallenge and validate the device's akaResponse. The IMSI is also included in the attested blob transmitted by the device MFA service to the Cloud MFA Service, ensuring that the device's identity can be verified. By relying on the IMSI as a key component of the authentication process, the system ensures accurate and secure identification of subscribers within the multi-factor authentication (MFA) framework.

Metadata means supplemental data that describes or provides information about the operational state or configuration of a device during the authentication process. Metadata may include information about the device's firmware version, UICC status, cryptographic key status, or prior authentication events. Metadata is often included in the validated akaChallenge response generated by the device MFA service and transmitted to the Cloud MFA Service. This data is securely stored in the cloud wallet for future reference, enabling the system to monitor device integrity, detect anomalies, and enforce security policies. By including metadata in the authentication process, the system enhances its ability to identify and respond to potential security risks.

ML-KEM (Modular Lattice Key Encapsulation Mechanism) refers to a cryptographic algorithm designed for secure key exchange and encapsulation, leveraging lattice-based cryptography to resist quantum computing attacks. In the context of the invention, ML-KEM plays a role in the initial key exchange process during multi-factor authentication (MFA) service activation. Its use ensures that sensitive cryptographic keys can be securely transmitted and stored while maintaining resistance to both classical and quantum computational threats. The ML-KEM process begins with the generation of a cryptographic key pair by the Device MFA Service. This key pair comprises an MFA Public Key, which is encapsulated and transmitted, and an MFA Private Key, which remains securely stored within the Trusted Execution Environment (TEE) of the user device. The encapsulation process, enabled by ML-KEM, generates a shared key alongside a ciphertext that can only be decrypted by the recipient possessing the corresponding private key. This shared key is then used to encrypt subsequent communications between the device and the Cloud MFA Service. The lattice-based foundation of ML-KEM provides inherent security advantages, including robustness against mathematical attacks such as those exploiting the structure of elliptic curves or integer factorization, which are vulnerabilities in traditional cryptographic methods. By adopting ML-KEM, the system ensures the confidentiality and integrity of cryptographic operations even in a post-quantum environment. In this invention, ML-KEM is integrated into the broader authentication framework to securely bootstrap the cryptographic relationship between the user device and the network. This initial exchange enables further secure processes, including attestation, validation, and encryption of sensitive data such as authentication challenges and user credentials.

Nonce means a one-time-use, cryptographically generated random or pseudo-random value included in authentication and encryption processes to ensure uniqueness and prevent replay attacks. In this invention, the nonce is a critical component of the akaChallenge generated during the EAP-AKA process. It ensures that each authentication session is unique and protects against adversaries attempting to reuse intercepted data. The nonce is included in the attested blob and encrypted communication to strengthen the security of key exchanges and validation processes.

OEM Identification Service means a service operated by the device's Original Equipment Manufacturer (OEM) to validate the authenticity and integrity of a user device during the multi-factor authentication (MFA) process. The OEM Identification Service receives attested blobs transmitted by the Cloud MFA Service, which include the device MFA public key, the Universal Integrated Circuit Card (UICC)-originated International Mobile Subscriber Identity (IMSI), the device token, and the attestation signature. Upon receiving the attested blob, the OEM Identification Service verifies the attestation signature and other included data to ensure the device has not been tampered with and originates from a legitimate OEM source. The service provides validation results to the Cloud MFA Service, which uses this information to proceed with further authentication steps, including interaction with the home operator node. By serving as a trusted intermediary in the authentication process, the OEM Identification Service enhances security and prevents unauthorized or compromised devices from accessing sensitive network resources.

Periodic Revalidation means the scheduled or event-driven repetition of the authentication process to verify the continued trustworthiness of a device within the multi-factor authentication (MFA) system. Periodic Revalidation involves the Cloud MFA Service coordinating with the device MFA service and the home operator node to repeat the Extensible Authentication Protocol-Authentication and Key Agreement (EAP-AKA) process. This includes generating new akaChallenges, validating akaResponses, and ensuring the integrity of stored cryptographic keys. Revalidation may be triggered by predefined time intervals, changes to the device environment (e.g., SIM card replacement), or security events flagged by the system. The process ensures that devices remain compliant with security standards and that any unauthorized changes or anomalies are promptly detected. Periodic Revalidation enhances the long-term reliability and resilience of the authentication framework.

Phone Number means the validated number associated with a device, retrieved from the home operator node during the authentication process. The Phone Number is derived independently of any number stored on the device and is included in the Secure Cloud Wallet alongside other authentication data. The use of a carrier-validated Phone Number enhances the integrity of the authentication process by ensuring that the number reflects the actual subscriber record maintained by the network operator, reducing the risk of spoofing or fraud.

Post-Quantum Cryptographic Algorithms means cryptographic techniques designed to resist attacks from quantum computers, which pose a threat to traditional public-key cryptographic systems. In the context of the multi-factor authentication (MFA) framework, post-quantum cryptographic algorithms are employed by the Cloud MFA Service to secure sensitive data transmissions, such as the encryption of akaChallenges, device tokens, and session keys. These algorithms may include lattice-based key encapsulation methods, such as Kyber, and other National Institute of Standards and Technology (NIST)-approved standards. By incorporating post-quantum cryptographic algorithms, the system ensures that authentication and data exchanges remain secure even against adversaries with access to quantum computational capabilities.

Private Key means the cryptographic key in a public-private key pair that is securely stored in the Trusted Execution Environment (TEE) of the user device. The Private Key is used by the device MFA service to perform cryptographic operations, such as signing the attestation signature included in the attested blob or decrypting encrypted data received from the Cloud MFA Service. The Private Key is never transmitted outside the device, ensuring its security against tampering or interception. It plays a critical role in enabling secure interactions between the device MFA service, the Cloud MFA Service, and other network entities, such as the home operator node and the OEM identification service. The confidentiality of the Private Key is foundational to the overall security of the multi-factor authentication (MFA) framework.

ProvID means a unique identifier assigned during the provisioning or key exchange process to track specific authentication or re-keying sessions. In this invention, ProvID is used by the Cloud MFA Service to associate cipher text, keys, and related metadata with a particular user device and authentication session. It facilitates efficient management of authentication workflows and ensures that session-specific data is securely handled and stored in the cloud wallet.

Public Key means the cryptographic key in a public-private key pair that is shared with external entities for secure communication and validation. In the multi-factor authentication (MFA) system, the Public Key is generated by the device MFA service and included in the attested blob transmitted to the Cloud MFA Service. The Public Key is used to verify the attestation signature, encrypt sensitive data such as akaChallenges or transaction details, and enable secure exchanges between the device and the Cloud MFA Service. The integrity and authenticity of the Public Key are validated as part of the device verification process, ensuring that it originates from a trusted source. By enabling asymmetric cryptography, the Public Key ensures that sensitive information remains secure during transmission and processing.

Push Notifications means secure messages transmitted from the Cloud MFA Service to the user device to facilitate user interaction during authentication or transaction approval processes. These notifications are encrypted with the device MFA public key to protect sensitive data, such as transaction details or authentication requests. Upon receipt, the user device decrypts the notification within the Trusted Execution Environment (TEE) and displays it to the user. The user's response is encrypted and returned to the Cloud MFA Service for validation. Push notifications ensure secure and seamless user involvement in multi-factor authentication workflows.

Quintuplet means a set of cryptographic parameters generated by the home operator node during the EAP-AKA process. The quintuplet typically includes the random number (RAND), the expected response (XRES), the ciphering key (CK), the integrity key (IK), and an authentication token (AUTN). These parameters are sent to the Cloud MFA Service and subsequently forwarded to the user device to complete the mutual authentication process. The quintuplet ensures that all necessary cryptographic elements are securely exchanged between the device and the network for session establishment and encryption.

Reactivation Request means a secure command initiated by the Cloud MFA Service to a user device when a device reactivation event is detected. The Reactivation Request triggers the device MFA service to generate a new key pair, create an updated attested blob, and re-establish mutual trust with the system by performing the Extensible Authentication Protocol-Authentication and Key Agreement (EAP-AKA) process. The request ensures that the device continues to meet security standards following changes such as SIM card replacement or firmware updates. By requiring devices to respond to Reactivation Requests, the system maintains a high level of security and prevents unauthorized devices from remaining within the authentication framework.

Re-Keying means the process of updating cryptographic keys to maintain security over time, especially following events such as UICC replacement, SIM ejection, or device reactivation. In this invention, re-keying is initiated by the Cloud MFA Service, which commands the device MFA service to generate a new key pair using the ML-KEM-1024 algorithm. The public key is encapsulated and transmitted to the Cloud MFA Service, which updates the shared key and securely stores the new key material in the cloud wallet. Re-keying ensures that prior sessions remain secure while enabling future communications to use updated cryptographic parameters.

Secure Cloud Wallet means a secure, cloud-based repository managed by the Cloud MFA Service for storing device-specific authentication data. The Secure Cloud Wallet holds validated information such as the phone number retrieved from the home operator node, the device token, the Universal Integrated Circuit Card (UICC)-originated International Mobile Subscriber Identity (IMSI), and the device MFA public key. The Secure Cloud Wallet is designed to ensure the integrity, confidentiality, and availability of the stored data through encryption and access controls. It plays a central role in enabling efficient and secure multi-factor authentication (MFA) processes by providing a reliable reference for verifying device credentials and managing session-related data.

Shared Key means a symmetric cryptographic key derived during the key exchange process between the device MFA service and the Cloud MFA Service. The Shared Key is used to encrypt and decrypt sensitive data transmitted between these entities, ensuring the confidentiality and integrity of the communication. In the context of the multi-factor authentication (MFA) framework, the Shared Key may be derived using post-quantum cryptographic algorithms, such as lattice-based methods, to resist emerging computational threats. By securing data exchanges with the Shared Key, the system protects against tampering, interception, and replay attacks, enhancing the overall robustness of the authentication process.

Shared Key Update means the process of securely replacing or refreshing a symmetric encryption key used for communication between the Cloud MFA Service and the user device. This process occurs during re-keying or when cryptographic integrity needs to be maintained. The rekey process generates a new shared key at the Cloud MFA Service as part of encapsulation and the generated cipher text is returned to the Device MFA Service. The cipher Text is decapsulated by using the MFA private key stored in the Trusted Execution Environment (TEE) to obtain the new shared key. The shared key update strengthens encryption and ensures that sensitive communications remain protected from evolving threats.

Transaction Details means specific information about a user-initiated action or request, such as a financial transaction, login attempt, or configuration change, that requires validation through the multi-factor authentication (MFA) system. Transaction Details are encrypted using the Device MFA Public Key's shared key and transmitted to the user device via a Device Push Notification for user approval. The user device decrypts the details within the Trusted Execution Environment (TEE) and provides the user with an opportunity to accept or reject the action. The validated response is then securely transmitted back to the Cloud MFA Service. By incorporating Transaction Details into the authentication process, the system ensures that users maintain control over sensitive actions, reducing the risk of unauthorized or fraudulent activity.

Universal Integrated Circuit Card (UICC)-Originated Device International Mobile Subscriber Identity (IMSI) means the unique identifier stored on the UICC and used by the multi-factor authentication (MFA) framework to authenticate the device with the carrier network. The UICC-Originated Device IMSI is included in the attested blob generated by the device MFA service and transmitted to the Cloud MFA Service. This IMSI is also provided to the home operator node during the Extensible Authentication Protocol-Authentication and Key Agreement (EAP-AKA) process, where it is used to generate akaChallenges and validate akaResponses. By relying on the UICC-Originated Device IMSI, the system ensures that the authentication process is tied to the device's identity as recognized by the carrier network, mitigating the risks associated with spoofing or tampering.

User Consent Response means a cryptographically secured acknowledgment or denial generated by the user device in response to a Device Push Notification. The User Consent Response contains information indicating whether the user has approved or rejected a specific transaction or authentication request. This response is encrypted using the device's private key and transmitted to the Cloud MFA Service for validation. Upon receiving the response, the Cloud MFA Service decrypts and verifies it, ensuring that the action reflects the user's intent. The User Consent Response provides a critical layer of user-driven security, ensuring that only authorized actions are carried out within the authentication framework.

User Device means any mobile or computing device equipped with a Universal Integrated Circuit Card (UICC) and capable of participating in the multi-factor authentication (MFA) process. The User Device hosts the device MFA service, which generates cryptographic keys, prepares attested blobs, processes authentication challenges, and communicates with the Cloud MFA Service. Examples of User Devices include smartphones, tablets, and IoT devices. By acting as a trusted endpoint in the authentication process, the User Device plays a pivotal role in ensuring the security and integrity of the MFA framework.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method for establishing mutual trust between a user device and a carrier network, the method performed by a cloud-based multi-factor authentication (MFA) service, the method comprising:
   a. receiving, by the cloud MFA service, an attested blob generated by a device MFA service, the attested blob comprising:
      i. a device MFA public key;
      ii. a Universal Integrated Circuit Card (UICC)-originated device international Mobile Subscriber Identity (IMSI); and
      iii. a device token;
   b. transmitting, by the cloud MFA service, the attested blob to an Original Equipment Manufacturer (OEM) identification service for validation of the user device;
   c. upon receiving validation from the OEM identification service, transmitting, by the cloud MFA service, the UICC-originated device IMSI to a home operator node associated with a carrier network, wherein the home operator node initiates an Extensible Authentication Protocol-Authentication and Key Agreement (EAP-AKA) process to generate an akaChallenge and a nonce thereby establishing mutual trust between the device and the carrier network;
   d. forwarding, by the cloud MFA service, the akaChallenge and the nonce to the device MFA service;
   e. receiving, by the cloud MFA service, a validated akaChallenge response and the nonce from the device MFA service;
   f. transmitting, by the cloud MFA service, the validated akaChallenge response from the home operator node for verification;
   g. receiving, by the cloud MFA service, a validated phone number associated with the device from the home operator node, the validated phone number being derived independently of the phone number stored on the device; and
   h. storing, by the cloud MFA service, in a secure cloud wallet the validated phone number, the device token, the UICC-originated device IMSI, and the device MFA public key.

2. The method of claim 1, wherein the attested blob further comprises an attestation signature generated by the device MFA service, the attestation signature being cryptographically verified by the OEM identification service, and wherein the
   secure cloud wallet is configured to associate the stored validated phone number, device token, UICC-originated device IMSI, and device MFA public key with a unique device identifier for subsequent authentication requests.

3. The method of claim 1, further comprising a step of periodically revalidating the UICC-originated device IMS] by repeating the EAP-AKA process between the cloud MFA service and the home operator node.

4. The method of claim 1, wherein the cloud MFA service encrypts the akaChallenge and nonce using a shared key associated with the device MFA public key before forwarding the akaChallenge and nonce to the device MFA service.

5. The method of claim 1, wherein the validated akaChallenge response received from the device MFA service includes metadata indicating the operational state of the user device, the metadata being stored in the secure cloud wallet along with the other stored data.

6. The method of claim 1, wherein the cloud MFA service employs post-quantum cryptographic algorithms to secure communication between the cloud MFA service, the OEM identification service, and the home operator node.

7. The method of claim 1, wherein the cloud MFA service initiates a reprovisioning process for the device MFA public key stored in the secure cloud wallet upon detecting a device event, the device event selected from a group consisting of a UICC replacement, a SIM ejection, or a device reactivation.

8. The method of claim 1, further comprising encapsulating, by the cloud MFA service, the device MFA public key to generate a shared key, the shared key being stored in the secure cloud wallet along with the UICC-originated device IMSI and device token.

9. The method of claim 1, further comprising decapsulating, by the device MFA service, encrypted data received from the Cloud MFA service using a private key associated with the device MFA service to validate a shared key and complete the key exchange process.

10. The method of claim 1, further comprising encrypting, by the cloud MFA service, the akaChallenge received from the home operator node by a shared key before forwarding the encrypted data to the device MFA service.

11. The method of claim 1, further comprising decrypting, by the cloud MFA service, an encrypted akaResponse received from the device MFA service to validate the device MFA service's computation of the akaResponse.

12. The method of claim 1, further comprising initiating, by the cloud MFA service, a device push notification to the user device for user consent validation, the notification containing transaction details encrypted with a shared key derived from the device MFA public key.

13. The method of claim 1, further comprising receiving, by the cloud MFA service, an encrypted user consent response from the device MFA service and decrypting the response to verify user approval of the transaction.

14. The method of claim 1, further comprising generating, by the device MFA service, a reactivation request to the cloud MFA service upon detecting a device reactivation event, the request triggering the generation of a new key pair by the device MFA service.

15. The method of claim 1, wherein the home operator node comprises:
   a. a Home Location Register (HLR) in 2G and 3G networks; and
   b. a Home Subscriber Server (HSS) in LTE and 5G networks,
wherein the home operator node performs authentication and authorization functions for the device based on the Universal Integrated Circuit Card (UICC)-originated device International Mobile Subscriber Identity (IMSI).

16. A system for managing authentication and authorization processes for a user device and a carrier network, the system comprising one on more processors; and a cloud-based multi-factor authentication (MFA) service configured to:
   a. receive, from a user device, an attested blob comprising cryptographic information, wherein the attested blob includes:
      i. a device MFA public key;
      ii. a Universal Integrated Circuit Card (UICC) originated device International Mobile Subscriber Identity (IMSI); and
      iii. a device token;
   b. transmit the attested blob to an Original Equipment Manufacturer (OEM) identification service for validation of the user device;

c. transmit the UICC-originated IMSI to a home operator node associated with the carrier network upon receiving validation of the user device from the OEM identification service, wherein the home operator node is configured to execute an Extensible Authentication Protocol-Authentication and Key Agreement (EAP-AKA) process to generate an akaChallenge and a nonce;

d. forward the akaChallenge and the nonce to the user device and receive, from the user device, a validated akaChallenge response and the nonce;

e. transmit the validated akaChallenge response to the home operator node for verification;

f. receive, from the home operator node, a validated phone number associated with the device, the validated phone number being derived from a Mobile Station International Subscriber Directory Number (MSISDN) independently of the phone number stored on the user device; and g. store, in a secure cloud wallet, the validated phone number derived from the MSISDN, the device MFA public key, the UICC-originated IMSI, and the device token.

17. The system of claim 16, wherein the device MFA service is configured to generate a shared key by:

a. transmitting the MFA public key to the cloud-based MFA service;

b. the cloud-based MFA service encapsulating the device MFA public key and generating a cipher text and the shared key;

c. transmitting the cipher text back to the device MFA service, where it is decapsulated to get the shared key; and d. the shared key generated by the cloud MFA service as part of encapsulation is securely stored in association with the validated phone number, the Universal Integrated Circuit Card-originated device IMSI and the device token within the secure cloud wallet.

18. The system of claim 16, wherein the device MFA service is configured to initiate periodic reprovisioning by transmitting a request to the cloud-based multi-factor authentication, MFA, service, the request triggering a new Extensible Authentication Protocol-Authentication and Key Agreement, EAP-AKA, process with the home operator node, including the validation of a newly retrieved Mobile Station International Subscriber Directory Number, MSISDN.

19. A non-transitory computer-readable medium storing instructions that, when executed by a processor, cause a cloud-based multi-factor authentication (MFA) service to:

a. receive, from a user device, an attested blob comprising cryptographic information, the attested blob including:

i. a device MFA public key;

ii. a Universal Integrated Circuit Card (UICC)-originated device International Mobile Subscriber Identity (IMSI); and iii. a device token;

b. transmit the attested blob to an Original Equipment Manufacturer (OEM) identification service for validation of the user device;

c. transmit the UICC-originated IMSI to a home operator node associated with a carrier network upon receiving validation of the user device from the OEM identification service, wherein the home operator node is configured to execute an Extensible Authentication Protocol-Authentication and Key Agreement (EAP-AKA) process to generate an akaChallenge and a nonce;

d. forward the akaChallenge and the nonce to the user device and receive, from the user device, a validated akaChallenge response and the nonce;

e. transmit the validated akaChallenge response to the home operator node for verification;

f. receive, from the home operator node, a validated phone number associated with the user device, the validated phone number being derived from a Mobile Station International Subscriber Directory Number (MSISDN), independently of the phone number stored on the user device; and g. store, in a secure cloud wallet, the validated phone number derived from the MSISDN, the device MFA public key, the UICC-originated IMSI, and the device token.

20. The non-transitory computer-readable medium of claim 19, wherein the instructions further cause the device MFA service to:

a. generate a shared key by decapsulating a cipher text received from the cloud MFA service, the cipher text generated as a result of encapsulating the device MFA public key by the cloud MFA service, the encapsulated shared key being securely stored in association with the validated phone number, the UICC-originated IMSI, and the device token within the secure cloud wallet; and b. initiate periodic reprovisioning by transmitting a request to the cloud-based MFA service, the request triggering a new Extensible Authentication Protocol-Authentication and Key Agreement (EAP-AKA) process with the home operator node, including the validation of a newly retrieved Mobile Station International Subscriber Directory Number (MSISDN).

\* \* \* \* \*